US009445314B2

(12) United States Patent
Melin et al.

(10) Patent No.: US 9,445,314 B2
(45) Date of Patent: Sep. 13, 2016

(54) METHODS AND DEVICES FOR RADIO ACCESS BEARER ESTABLISHMENT

(75) Inventors: Lena Melin, Vaxholm (SE); Paulson Angelo Vijay Silveris, Bangalore (IN)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 0 days.

(21) Appl. No.: 14/415,371

(22) PCT Filed: Jul. 19, 2012

(86) PCT No.: PCT/SE2012/050843
§ 371 (c)(1),
(2), (4) Date: Jan. 16, 2015

(87) PCT Pub. No.: WO2014/014395
PCT Pub. Date: Jan. 23, 2014

(65) Prior Publication Data
US 2015/0172961 A1 Jun. 18, 2015

(51) Int. Cl.
*H04W 36/00* (2009.01)
*H04W 76/02* (2009.01)
*H04W 76/04* (2009.01)
*H04W 88/06* (2009.01)

(52) U.S. Cl.
CPC ....... *H04W 36/0022* (2013.01); *H04W 76/026* (2013.01); *H04W 76/046* (2013.01); *H04W 88/06* (2013.01)

(58) Field of Classification Search
None
See application file for complete search history.

(56) References Cited

U.S. PATENT DOCUMENTS

2012/0258707 A1* 10/2012 Mathias ............... H04W 36/30
455/426.1

FOREIGN PATENT DOCUMENTS

| WO | 2006092769 A1 | 9/2006 |
| WO | 2010019364 A1 | 2/2010 |
| WO | 2011050525 A1 | 5/2011 |
| WO | 2012045486 A1 | 4/2012 |

OTHER PUBLICATIONS

3GPP, "3rd Generation Partnership Project; Technical Specification Group Radio Access Network; Radio Resource Control (RRC); Protocol specification (Release 11)", 3GPP TS 25.331 V11.2.0, Jun. 2012, Jan. 1944.
Unknown, Author, "3GPP TS 23.272 V10.6.0", 3rd Generation Partnership Project; Technical Specification Group Services and System Aspects; Circuit Switched (CS) fallback in Evolved Packet System (EPS); Stage 2 (Release 10), Dec. 2011, pp. 1-81.

(Continued)

*Primary Examiner* — Afshawn Towfighi
(74) *Attorney, Agent, or Firm* — Patents on Demand, P.A.; Brian K. Buchheit; Scott M. Garrett

(57) ABSTRACT

The disclosure relates to a method 10 for radio access bearer establishment performed in a wireless device 8 of a communication system 1. The communication system 1 comprises a network node 4 configured to provide radio access bearers to the wireless device 8. The method 10 comprises detecting 11 a need for a circuit switched service and a packet switched service during a communication session, and indicating 12, to the network node 4, a need for a circuit switched radio access bearer towards a circuit switched core network 3 providing the circuit switched service and for a packet switched radio access bearer towards a packet switched core network 2 providing the packet switched service.

12 Claims, 4 Drawing Sheets

(56) References Cited

OTHER PUBLICATIONS

Unknown, Author, "3GPP TS 24.008 V10.6.0", 3rd Generation Partnership project; Technical Specification Group Core Network and Terminals; Mobile Radio Interface Layer 3 Specification; Core Network Protocols; State 3 (Release 10), Mar. 2012, pp. 1-631.

Unknown, Author, "3GPP TS 25.331 V8.18.0", 3rd Generation Partnership Project; Technical Specification Group Radio Access Network; Radio Resource Control (RRC); Protocol Specification (Release 8), Mar. 2012, pp. 1-1733.

Unknown, Author, "3GPP TS 25.413 V10.5.0", 3rd Generation Partnership Project; Technical Specification Group Radio Access Network; UTRAN Iu Interface Radio Access Network Application Part (RANAP) Signalling (Release 10), Mar. 2012, pp. 1-428.

* cited by examiner

__US 9,445,314 B2__

METHODS AND DEVICES FOR RADIO ACCESS BEARER ESTABLISHMENT

TECHNICAL FIELD

The technology disclosed herein relates generally to the field of wireless communication systems, and in particular to establishment of radio access bearers within such wireless communication systems.

BACKGROUND

Early wireless communication systems were used only for voice communication, while more recent wireless communication systems also allows for non-voice data communication and combinations of both types, for example video calls and downloading of movies. A circuit switched core network handles, in most cases, end to end voice call setup and mobility management in the wireless communication system, while a packet switched core network handles end to end packet call setup and mobility management in the wireless communication system.

The present day wireless communication systems face a great challenge from the increasing usage of sophisticated wireless devices, such as smart phones. These wireless devices are able to handle multiple active connections (Radio Access Bearers, RABs) simultaneously and thereby support both data and voice traffic: updating various applications, sending and receiving e-mails in the background while making or receiving voice call. This mixture of circuit and packet switched connection types requires some consideration. For example, voice communication is generally more delay sensitive than non-voice data communication, and should be handled accordingly, e.g. by prioritizing circuit switched call setup before packet switched setup, otherwise the users will experience bad availability. Signaling of core network domain indicators was introduced in 3GPP Rel-6, wherein a wireless device includes a domain indicator indicating if a connection establishment is desired to a circuit switched core network or to a packet switched core network. A network node is thereby able to prioritize the connection establishment based on the domain indicator.

However, in various scenarios and for different reasons, packet switched connections are nevertheless set up prior to circuit switched connections. As a particular example of a scenario when this problem may occur, the circuit switched fallback (CSFB) mechanism can be mentioned. CSFB provides voice services for Long Term Evolution (LTE) subscribers by reusing the Global System for Mobile Communications/Universal Mobile Telecommunications System (GSM/UMTS) network. When a wireless device in the LTE network initiates or receives a voice call, a mobility management entity (MME) requests an Evolved Node B (eNB) to redirect the wireless device to the UMTS network or to the GSM network, and connections within the LTE network are released. For example, if the wireless device has an active LTE data session when a voice call is initiated or received, the wireless device will remember the status of the data connection at a Non Access Stratum (NAS) layer and it will initiate signaling connection setup towards both the packet switched domain and the circuit switched domain when the wireless device is successfully redirected from LTE to UMTS network. In this scenario it often happens that the packet switched core network is able to establish a radio access bearer for the wireless device faster than the circuit switched core network establishes its radio access bearer.

SUMMARY

An object of the present disclosure is to overcome or at least alleviate one or more of the above mentioned problems. It is a particular object to reduce delay in speech setup experienced by a user.

The object is, according to a first aspect, achieved by a method for radio access bearer establishment performed in a wireless device of a communication system. The communication system comprises a network node configured to provide radio access bearers to the wireless device. The method comprises detecting a need for a circuit switched service and a packet switched service during a communication session, and indicating, to the network node, a need for a circuit switched radio access bearer towards a circuit switched core network providing the circuit switched service and for a packet switched radio access bearer towards a packet switched core network providing the packet switched service.

By providing, at an early stage, the network node with information about the need for both a circuit switched radio access bearer and a packet switched radio access bearer, the network node is able to perform a coordinated radio access bearer establishment of the two types of radio access bearers. Having this information the radio network node is able to e.g. prioritize the circuit switched radio access bearer over the packet switched radio access bearer or the other way round. This in turn enables e.g. a faster circuit switched voice call set-up, which provides an increased user satisfaction. Further, the indication to the network node of the need for both a circuit switched radio access bearer and a packet switched radio access bearer enables the network node to initiate simultaneous circuit switched and packet switched radio access bearer establishments, which will reduce the signaling load in the access network.

The object is, according to a second aspect, achieved by a wireless device adapted for wireless communication in a communication system. The communication system comprises a network node configured to provide radio access bearers to the wireless device. The wireless device comprises a processing unit configured to detect a need for a circuit switched service and a packet switched service during a communication session, and indicate, to the network node, a need for a circuit switched radio access bearer towards a circuit switched core network providing the circuit switched service and for a packet switched radio access bearer towards a packet switched core network providing the packet switched service.

The object is, according to a third aspect, achieved by a method for radio access bearer establishment performed in a network node of a communication system. The network node is configured to provide radio access bearers to a wireless device. The method comprises receiving, from the wireless device, an indication for a need of a circuit switched radio access bearer and a packet switched radio access bearer, and establishing, for the wireless device, a circuit switched radio access bearer towards a circuit switched core network and a packet switched access bearer towards a packet switched core network.

The object is, according to a fourth aspect, achieved by a network node for radio access bearer establishment in a communication system. The network node is configured to provide radio access bearers to a wireless device. The network node comprises a processing unit configured to receive, from the wireless device, an indication for a need of a circuit switched radio access bearer and a packet switched radio access bearer, and establish, for the wireless device, a circuit switched radio access bearer towards a circuit switched core network and a packet switched radio access bearer towards a packet switched core network.

Further features and advantages of the present disclosure will become clear upon reading the following description and the accompanying drawings.

DETAILED DESCRIPTION OF EMBODIMENTS

Figure 1:
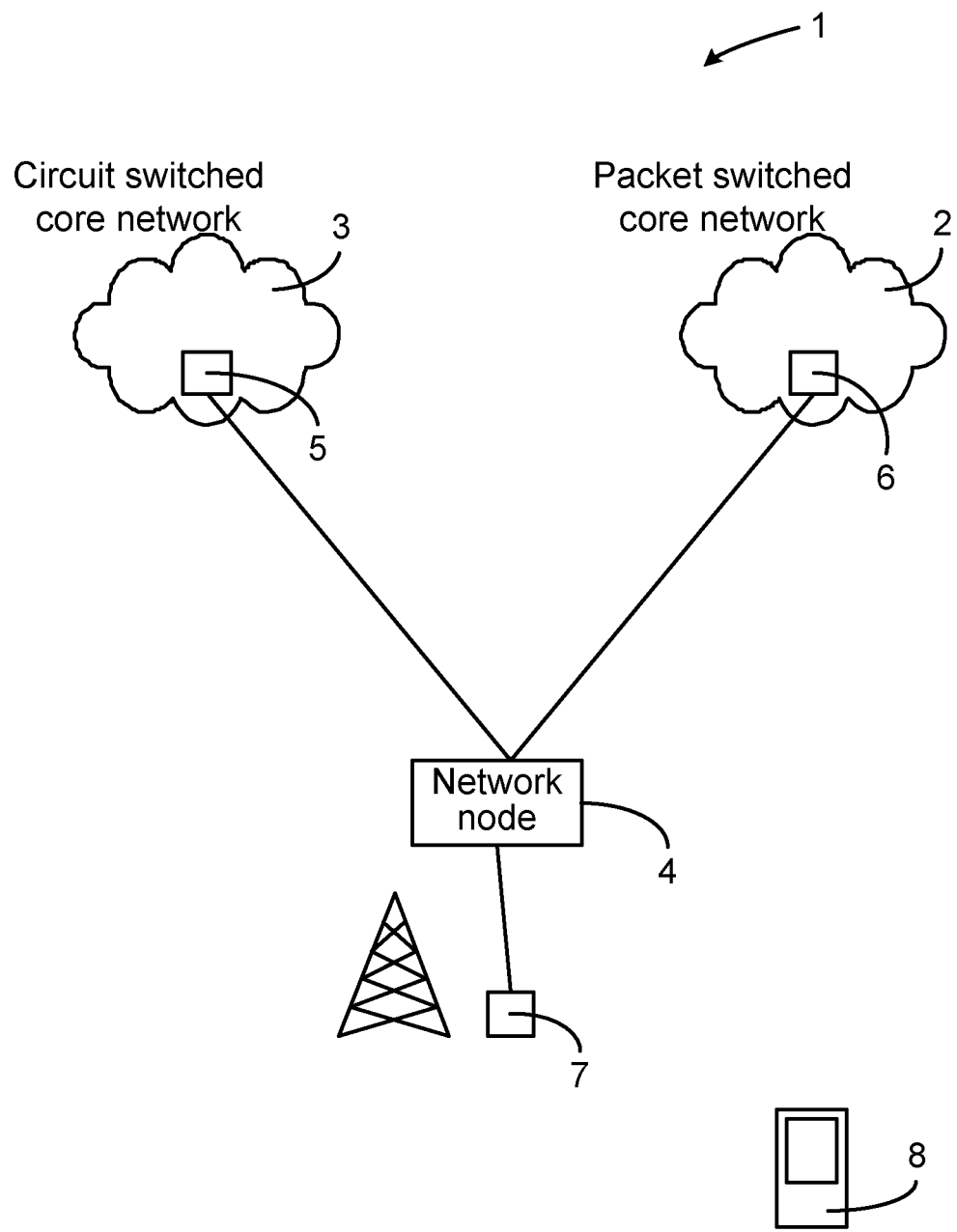
FIG. 1 illustrates schematically an environment in which embodiments of the present disclosure may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates schematically an environment in which embodiments of the present disclosure may be implemented. In particular, FIG. 1 illustrates a communication system 1 comprising a circuit switched core network 3 and a packet switched core network 2.

The circuit switched core network (CS CN) 3 handles end to end voice call setup and mobility management in the communication system 1. As an example, the CS CN 3 may comprise a GSM/UMTS network, and the call setups and mobility management would then be handled by a mobile switching center (MSC). In FIG. 1, a network node handling the circuit switched call setups is indicated at reference numeral 5 and is in the following denoted CS mobility node 5. It is noted that the CS CN 3 typically comprises additional network nodes, not illustrated in the figure, for example gateways to other networks and servers keeping track of the location of the wireless devices serviced by the CS CN 3. Continuing the example of the CS CN 3 comprising a GSM/UMTS network, examples of such additional network nodes comprises media gateway and home location registers (HLRs).

The packet switched core network (PS CN) 2 handles end to end packet call setup and mobility management in the communication system 1. As an example, the PS CN 2 may comprise an LTE network, and the packet call setup and mobility management would then be handled by a mobile mobility entity (MME). In FIG. 1, a network node handling the packet switched call setups is indicated at reference numeral 6 and is in the following denoted PS mobility node 6. It is noted that the PS CN 2 typically comprises additional network nodes, not illustrated in the figure, for example gateways to other networks and servers keeping track of the location of the wireless devices serviced by the PS CN 2. Continuing the example of the PS CN 2 comprising an LTE network, examples of such additional network nodes comprises Serving Gateway (SGW), Packet Data Network (PDN) Gateway (PGW) and Home Subscriber Server (HSS).

The communication system 1 comprises a network node 4, e.g. a radio network controller. The network node 4 is connected to the CS mobility node 5 and to the PS mobility node 6. The network node 4 is configured to control base station nodes 7 and is connected to a number of such base station nodes 7 (only one illustrated in the figure). The network node 4 may further be configured to perform a variety of functions, e.g. radio resource management and some mobility management functions.

The communication system 1 thus comprises a number of base station nodes 7 configured to provide wireless communication links for a number of wireless devices 8. The base station node 7 is denoted differently depending on communication system; in LTE the base station node 7 is denoted evolved Node B (and also eNodeB and eNB), while it is denoted Base Transceiver Station (BTS) in GSM.

The wireless device 8 is a device able to receive and/or transmit wireless signaling. The wireless device 8 should be construed as encompassing various types of devices such as for example mobile phones, smart phones, or laptops. Depending on type of device, and sometimes also depending on communication system in which it is used, the wireless device 8 may be denoted differently, for example user equipment or mobile device. The wireless device 8 is configured for handling circuit switched calls as well as packet switched calls.

Figure 2:
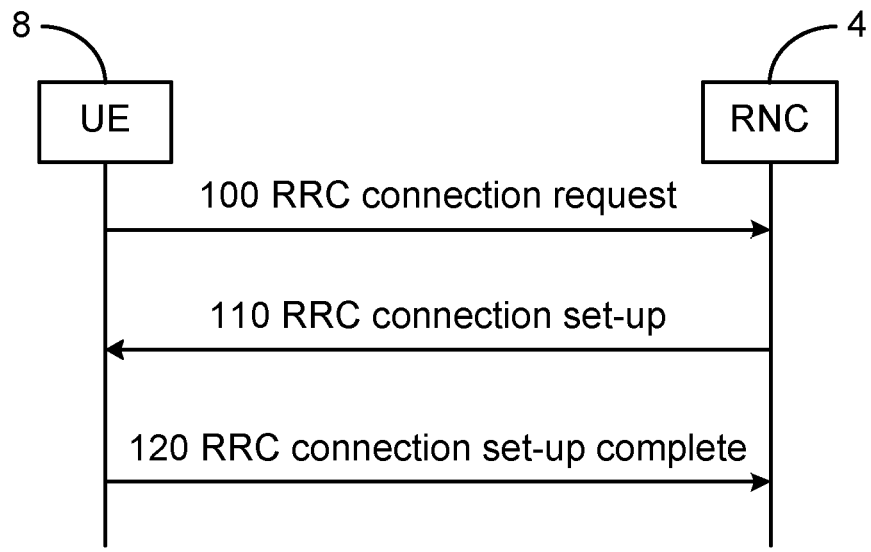
FIG. 2 is a sequence diagram illustrating an aspect of the present disclosure.

FIG. 2 is a sequence diagram illustrating an aspect of the present disclosure. In particular, the signaling between the wireless device 8 and the network node 4 upon Radio Resource Control (RRC) connection setup for UTRAN is illustrated. For further details on RRC connection procedures, reference is made to 3GPP TS 25.331, Radio Resource Control (RRC); Protocol specification (UTRAN).

At arrow 100, the wireless device 8 signals to the network node 4 (via the base station node 7) its desire for a connection establishment by sending an RRC connection request message. The network node 4 sets up a radio link for the wireless device (not illustrated in the figure) and sends, at arrow 110, an RRC connection setup message providing the wireless device 8 with information such as physical channel. The wireless device 8 performs synchronization (not illustrated in the figure) and then sends, at arrow 120, an RRC connection setup complete message to the network node 4 acknowledging the establishment. The above signaling is the same for the case that the wireless device 8 instead receives a call, with the exception that a paging procedure for locating the wireless device 8 is first performed.

Upon completion of the RRC connection establishment, the wireless device 8 starts setting up a signaling connection to a CN and provides an indication to the CN about the service requested via RRC Initial direct transfer (IDT). Thereafter, a radio access bearer (RAB) setup procedure provides a radio access bearer service between the wireless device 8 and the CN, and a call is established.

Briefly, in an aspect of the present invention, the wireless device 8 is configured to indicate to the network node 4 that it will require both CS and PS services. The wireless device 8 may indicate this information in different ways, as will be described. In prior art, only one domain indicator is allowed, indicating whether a CS or a PS service is desired. The wireless device would then set an information element of a RRC connection establishment message to either PS Domain or to CS Domain. The present disclosure provides a new information element for supporting the signaling of an additional CN domain, or uses an existing information element with a new value to signal the additional CN domain. The wireless device 8 is thus enabled to signal both CS and PS domain indicators.

In an embodiment, the information about the additional CN domain is added to the RRC connection request message (compare arrow 100 of FIG. 2). The RRC connection request message is thus extended to include a new information element, in the following denoted "Additional Domain Indicator". If the wireless device 8 is setting up the RRC connection to establish signaling connection towards both CS and PC domain, then it is configured to include both the information element "Domain indicator" and the "Additional Domain Indicator" in the RRC connection request message.

It is noted that the setting of CN domain identity in such information elements may be implementation specific for the wireless device 8. For example, if the wireless device 8 wants to establish the signaling connection towards CS domain for speech call setup and PS domain for registration, then the wireless device 8 may set the information element "Domain Indicator" to CS domain and the new information element "Additional Domain Indicator" to PS domain. The wireless device 8 may be configured to include both CS and PS Domain in the RRC connection request message only in case it needs both CS and PS RAB to be established.

Below an extract of an RRC connection request message is illustrated, provided with the new information element.

| Information element/Group name | Need | Multi | Type and reference | Semantics description |
|---|---|---|---|---|
| UE information elements | | | | |
| Domain indicator | MP (mandatory present) | | Core Network domain identity | |
| Call type | CV (conditional on value)- Circuit switched- Domain | | Enumerated (speech, video, other) | One spare value is needed |
| Additional Domain Indicator | Optional | | Core Network domain identity | |

The UE information element "Domain indicator" and the new information element "Additional Domain Indicator" are thus used by the wireless device 8 to indicate to the network node 4 that it needs both types of services (i.e. circuit switched and packet switched).

In another embodiment, the information about the additional CN domain is added to the RRC connection setup complete message (compare arrow 120 of FIG. 2). If the wireless device 8 is setting up the RRC connection to establish signaling connection towards both CN and PS domain, then the wireless device 8 may include the information element "Domain Indicator" in the RRC connection request message and the new information element "Additional Domain Indicator" in the RRC connection setup complete message.

As for the previous embodiment, it is noted that the setting of CN domain identity in these information elements may be implementation specific for the wireless device 8. For instance, if the wireless device 8 wants to establish the signaling connection towards CS domain for speech call setup and PS domain for registration, then the wireless device 8 may set the information element "Domain Indicator" to CS Domain in the RRC connection request message and the new information element "Additional Domain Indicator" to PS domain in the RRC connection setup complete message. The wireless device 8 may include CS and PS domain in the RRC connection request message and RRC connection setup complete, respectively, only in case the wireless device 8 needs both CS and PS RAB to be established.

Below an extract of an RRC connection setup complete message is illustrated, provided with the new information element.

| Information element/Group name | Need | Multi | Type and reference | Semantics description |
|---|---|---|---|---|
| UE information elements | | | | |
| Core Network Domain indicator | MP (mandatory present) | | Core Network domain identity | |
| Other information elements | | | | |
| Additional Domain Indicator | Optional | | Core Network domain identity | |

The UE information element "Domain indicator" and the new information element "Additional Domain Indicator" under group name "Other information element" are thus used for indicating to the network node 4 that the wireless device 8 needs both types of services (i.e. circuit switched and packet switched).

Figure 3:
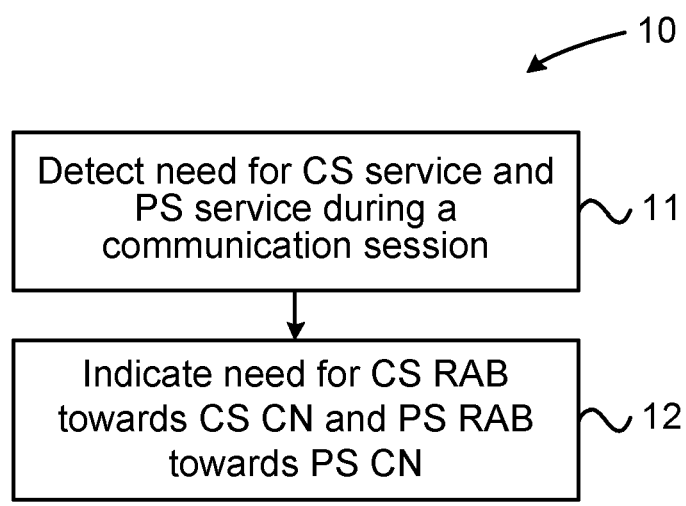
FIG. 3 is a flow chart of an embodiment of a method performed in a wireless device.

FIG. 3 is a flow chart of an embodiment of a method performed in a wireless device, such as the wireless device 8 described in relation to FIG. 1. The method 10 for radio access bearer establishment is performed in a wireless device 8 of a communication system 1, such as the one described in relation to FIG. 1. The communication system 1 comprises a network node 4, for example a radio network controller, configured to provide radio access bearers to the wireless device 8. The method 10 comprises detecting 11 a need for a circuit switched service and a packet switched service during a communication session.

The method 10 further comprises indicating 12, to the network node 4, a need for a circuit switched radio access bearer towards a circuit switched core network 3 providing the circuit switched service and for a packet switched radio access bearer towards a packet switched core network 2 providing the packet switched service.

In an embodiment, the detecting 11 is performed by detecting a change of radio access network (RAN), at connection initiation and/or at a radio resource control establishment. For example, if the wireless device 8 is about to change RAN, e.g. at a CSFB procedure, the wireless device 8 may be configured to detect the need for both CS and PS services. As another example, the wireless device 8 may be involved in a voice call (i.e. circuit switched service) and be aware of that a transmission or reception of data (i.e. packet switched service) is needed immediately or during the voice call, then the wireless device 8 is able to detect such need.

In an embodiment, indicating 12 the need for a circuit switched radio access bearer and a packet switched radio access bearer comprises including a circuit switched domain indicator and a packet switched domain indicator in a radio resource control connection request message.

In an embodiment, the need for a circuit switched radio access bearer is indicated in a first domain indicator information element of a radio resource control connection request message and the need for a packet switched radio access bearer is indicated in a second domain indicator information element of the radio resource control connection request message, or wherein the need for a packet switched radio access bearer is indicated in a first domain indicator information element of a radio resource control connection request message and the need for a circuit switched radio access bearer is indicated in a second domain indicator information element of the radio resource control connection request message. As an example, the first domain indicator information element may comprise a domain indicator information element complying with an existing and launched communication standard, e.g. 3GPP TS 25.331 Release 6, while the second domain indicator information element is an additional domain indicator added as a new domain indicator information element in a later release, e.g. 3GPP TS 25.331 Release 11.

In an embodiment, indicating 12 the need for a circuit switched bearer and a packet switched bearer is performed by indicating the need for a circuit switched radio access bearer in a first domain indicator information element of a radio resource control connection request message and indicating the need for a packet switched radio access bearer in a second domain indicator information element of a radio resource control connection setup complete message, or by indicating the need for a packet switched radio access bearer in a first domain indicator information element of a radio resource control connection request message and indicating the need for a circuit switched radio access bearer in a second domain indicator information element of a radio resource control connection setup complete message.

Figure 4:
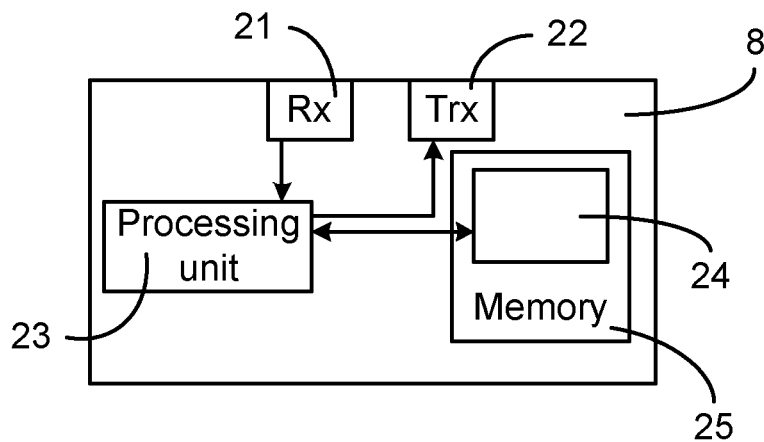
FIG. 4 illustrates an exemplifying wireless device comprising means for implementing embodiments of the methods.

FIG. 4 illustrates a wireless device 8 comprising means for implementing embodiments of the methods as described. The wireless device 8 is adapted for wireless communication in a communication system 1, as the one described with reference to FIG. 1. To this end, the wireless device 8 comprises one or more transmitter devices 22 and receiver devices 21, comprising e.g. radio front-end circuitry and antennas.

The wireless device 8 further comprises a processing unit 23, e.g. a central processing unit (CPU), microcontroller, digital signal processor (DSP), etc., capable of executing software instructions stored in a computer program product 25 e.g. in the form of a memory. The processing unit 23 is connected to the receiver device 21 by means of which it receives signaling from the base station node 7. The processing unit 23 is connected to the transmitter device 22 by means of which it transmits signaling to the base station node 7.

It is noted that the wireless device 8 typically comprises further components and/or circuitry conventionally used for performing e.g. various signal processing, but not illustrated in the figure, such as e.g. modulator, demodulator, combiners, duplexers, power amplifiers etc.

The described methods and algorithms or parts thereof for radio access bearer establishment may be implemented e.g. by software and/or application specific integrated circuits in the processing unit 23. To this end, the wireless device 8 may further comprise a computer program 24 stored on the computer program product 25.

The processing unit 23 is configured to detect a need for a circuit switched service and a packet switched service during a communication session, and to indicate, to the network node 4, a need for a circuit switched radio access bearer towards a circuit switched core network 3 providing the circuit switched service and for a packet switched radio access bearer towards a packet switched core network 2 providing the packet switched service. The processing unit 23 may be configured to perform such detection and providing of RABs in any of the earlier described ways.

With reference still to FIG. 4, the present disclosure also provides the computer program 24 for radio bearer establishment. The computer program 24 comprises computer program code which when run on the wireless device 8, and in particular the processing unit 23 thereof, causes the wireless device 8 to perform the methods as described.

A computer program product 25 is also provided comprising the computer program 24 and computer readable means on which the computer program 24 is stored. The computer program product 25 may be any combination of read and write memory (RAM) or read only memory (ROM). The computer program product 25 may also comprise persistent storage, which, for example can be any single one or combination of magnetic memory, optical memory, or solid state memory.

Figure 5:
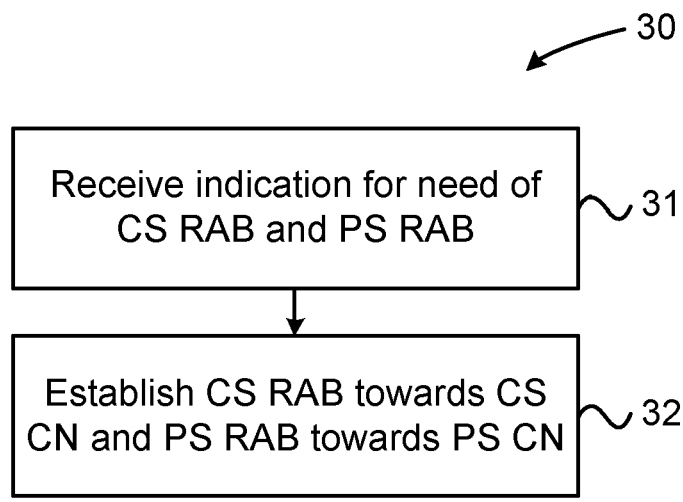
FIG. 5 is a flow chart of an embodiment of a method performed in a network node.

FIG. 5 is a flow chart of an embodiment of a method performed in a network node. The method 30 for radio access bearer establishment is performed in a network node 4 of a communication system 1, such as the one described in relation to FIG. 1. The network node 4 is configured to provide radio access bearers to a wireless device 8. The method 20 comprises receiving 31, from the wireless device 8, an indication for a need of a circuit switched radio access bearer and a packet switched radio access bearer.

The method 30 further comprises establishing 32, for the wireless device 8, a circuit switched radio access bearer towards a circuit switched core network 3 and a packet switched access bearer towards a packet switched core network 2.

In an embodiment, receiving 31 the indication for a need for a circuit switched radio access bearer and a packet switched radio access bearer comprises receiving in a radio resource control connection request message a circuit switched domain indicator and a packet switched domain indicator.

In another embodiment, the receiving 31 the indication for a need for a circuit switched radio access bearer and a packet switched radio access bearer comprises receiving in a radio resource control connection request message and a radio resource control connection setup complete message, respectively, a circuit switched domain indicator and a packet switched domain indicator.

In an embodiment, establishing 32 a circuit switched radio access bearer and a packet switched radio access bearer for the wireless device 8 comprises prioritizing a setup of the circuit switched radio access bearer over a setup of the packet switched radio access bearer. In another embodiment, the prioritizing is the reverse, i.e. the setup of the packet switched radio access bearer is prioritized over the setup of the circuit switched radio access bearer.

In an embodiment, establishing 32 a circuit switched radio access bearer and a packet switched radio access bearer for the wireless device 8 comprises performing an individual radio access bearer establishment for each radio access bearer type to a respective core network element 5, 6 of the circuit switched core network 3 and packet switched core network 2, respectively.

In an embodiment, establishing 32 a circuit switched radio access bearer and a packet switched access bearer for the wireless device 8 comprises performing a combined radio access bearer establishment procedure for the circuit switched radio access bearer and the packet switched radio access bearer.

In an embodiment, in the establishing 32, a circuit switched radio access bearer is prioritized over a packet switched radio access bearer. The user expects a voice call to be set up immediately without any delay, while often accepting delays in the setting up of packet services. By prioritizing the circuit switched radio access bearer establishment over the packet switched radio access bearer establishment an improved user satisfaction is obtained.

Figure 6:
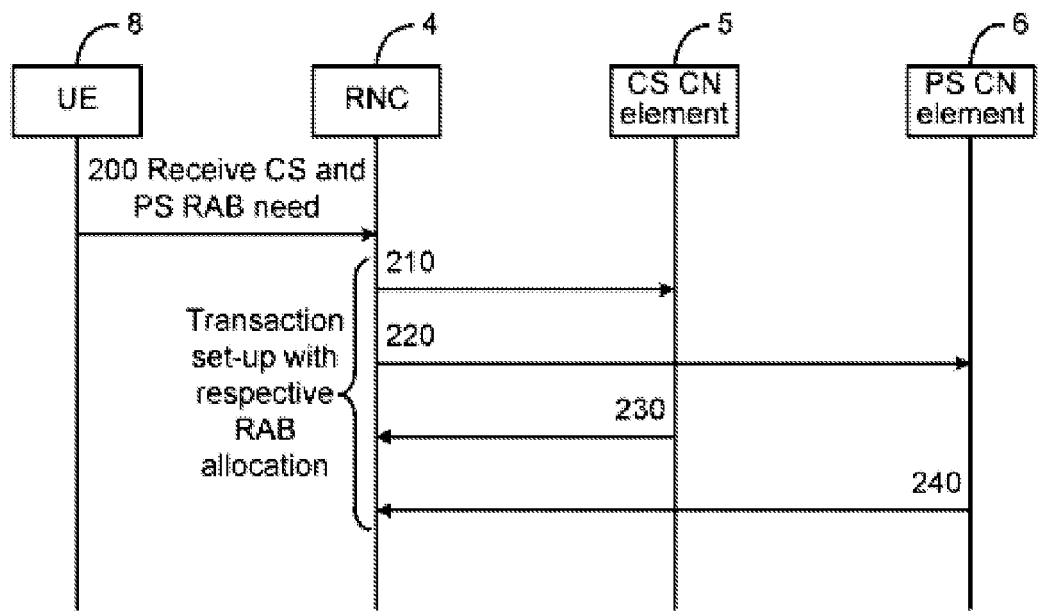
FIG. 6 is a sequence diagram illustrating part of a RANAP signaling.

For sake of completeness FIG. 6 is provided, illustrating a sequence diagram of an aspect of the present disclosure, and in particular transaction setup with respective RAB allocation. The network node 4 receives (arrow 200) a message from the wireless device 8, the message indicating the need for a circuit switched radio access bearer and a packet switched radio access bearer. This can be performed in any of the ways described earlier, for example by receiving this indication in an RRC connection request message from the wireless device 8.

The network node 4 then performs the transaction setup with respective RAB allocation towards the CS CN 3 and towards the PS CN 2. At arrow 210, the network node 4 sends a RAB assignment response to the CS CN mobility node 5. A corresponding message is sent (arrow 220) to the PS CN mobility node 6. The network node 4 receives in response a message from the CS CN mobility node 5 (arrow 230) and a message from the PS CN mobility node 6 (arrow 240), confirming an active Packet Data Protocol (PDP) context. The step of establishing 32, for the wireless device 8, a circuit switched radio access bearer towards a circuit switched core network 3 and a packet switched access bearer towards a packet switched core network 2 may be performed according to such set up. The wireless device 8 is now able to exchange packet switched data with the PS CN 2 and also have a circuit switched call towards the CS CN 3. For further details on such RANAP procedures, reference is made to 3GPP TS 25.413, UTRAN Iu interface Radio Access Network Application Part (RANAP) signaling.

Figure 7:
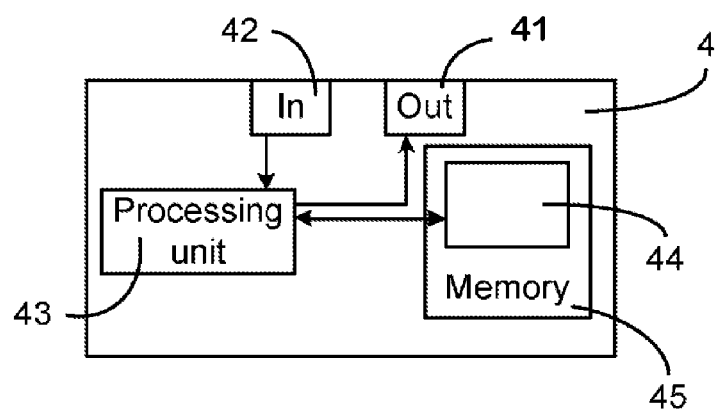
FIG. 7 illustrates an exemplifying network node comprising means for implementing embodiments of the methods.

FIG. 7 illustrates an exemplifying network node comprising means for implementing embodiments of the methods. The network node 4 comprises a processing unit 43, e.g. a central processing unit (CPU), microcontroller, digital signal processor (DSP), etc., capable of executing software instructions stored in a computer program product 45 e.g. in the form of a memory. The processing unit 43 is connected to an input device 42 of the network node 4, by means of which it receives information from the wireless device 8, via the base station node 7. That is, the network node 4 may be in wired connection with the base station node 7, which in turn is in wireless communication with the wireless device 8. The processing unit 23 is connected to an output device 41 by means of which it transmits information to the base station node 7.

It is noted that the network node 4 may comprise further components and/or circuitry not illustrated in the figure.

The described methods and algorithms or parts thereof for radio access bearer establishment may be implemented e.g. by software and/or application specific integrated circuits in the processing unit 43. To this end, the network node 4 may further comprise a computer program 44 stored on the computer program product 45.

The processing unit 43 is configured to receive, from the wireless device 8, an indication for a need of a circuit switched radio access bearer and a packet switched radio access bearer, and to establish, for the wireless device 8, a circuit switched radio access bearer towards a circuit switched core network 3 and a packet switched radio access bearer towards a packet switched core network 2.

With reference still to FIG. 7, the present disclosure also provides the computer program 44 for radio bearer establishment. The computer program 44 comprises computer program code which when run on the network node 4, and in particular the processing unit 43 thereof, causes the network node 4 to perform the methods as described.

A computer program product 45 is also provided comprising the computer program 44 and computer readable means on which the computer program 44 is stored. The computer program product 45 may be any combination of read and write memory (RAM) or read only memory (ROM). The computer program product 45 may also comprise persistent storage, which, for example can be any single one or combination of magnetic memory, optical memory, or solid state memory.

In various aspects and in different scenarios, the present disclosure provides advantages by the wireless device 8 informing, at an early stage, the network node 4 about the need for both a PS service and a CS service.

For example, if the PS domain indicator and the CS domain indicator are included in the RRC connection request or the RRC Connection setup complete message, the network node 4 has, particularly in case of high load, a means to prioritize the CS call setup over the PS setup. A faster CS call setup may thereby be provided, which increases the user satisfaction.

If the wireless device 8 wishes to establish PS RAB and CS RAB at the same time, it may be configured to send RRC Initial Direct Transfer (IDT) message to both the CS domain (i.e. the CS mobility node 5) and to the PS domain (i.e. the PS mobility node 6). The network node 4 may handle the IDT and corresponding RANAP RAB assignment request message from the CNs independently. That is, the network node 4 runs individual RAB establishment procedures for each domain.

Since the network node 4 is notified early and knows that both PS and CS RABs are required, it is enabled to wait for RANAP RAB assignment requests from both the PS domain (i.e. the PS mobility node 6) and from the CS domain (i.e. the CS mobility node 5) and is thereby able to execute a combined PS and CS RAB establishment procedure.

As yet another scenario: the wireless device 8 is using packet switched speech service in LTE, anchored in IP Multimedia Subsystem (IMS), and is moving out of LTE coverage. LTE radio access network may trigger an (SRVCC) procedure, which is an LTE functionality that allows a voice over internet protocol(VoIP)/IMS call in the LTE packet domain to be moved to a legacy voice domain (e.g. GSM/UMTS). The LTE RAN may thus trigger the SRVCC procedure towards UMTS in case SRVCC is supported by the wireless device 8 and all the LTE, EPS and UMTS RAN and CN nodes involved. However, in case SRVCC is not supported, the wireless device 8 might be redirected to UMTS (PS CN 3) as a last chance of keeping any service. In such case, the wireless device 8 may, according to aspects of the present disclosure, attempt to register in both core networks (PS CN 2 and CS CN 3) and the both domain indicators ("Domain indicator" and "Additional Domain indicator") provides the benefit that a combined PS and CS RAB establishment procedure reduces setup delay. This reduces signaling load in the communication system 1 and improves the user experience.

The invention claimed is:

1. A method for radio access bearer establishment, performed in a wireless device of a communication system, the communication system comprising a network node configured to provide radio access bearers to the wireless device, the method comprising:
   detecting a need for both a circuit switched service and a packet switched service during a communication session; and
   indicating, to the network node, a need for both a circuit switched radio access bearer towards a circuit switched core network providing the circuit switched service and for a packet switched radio access bearer towards a packet switched core network providing the packet switched service, wherein the network node is indicated by including a first domain indicator of the circuit switched core network and a second domain indicator of the packet switched core network in a single radio resource control connection request message.

2. The method of claim 1, wherein the detecting is performed by detecting a change of radio access network, at connection initiation and/or at a radio resource control establishment.

3. The method of claim 1, wherein the need for 1, the circuit switched radio access bearer is indicated in a first domain indicator information element or a second domain indicator information element of the radio resource control connection request message and the need for the packet switched radio access bearer is indicated in the other one of the first and second domain indicator information elements of the radio resource control connection request message.

4. The method as claimed in claim 1, wherein indicating the need for both the circuit switched radio access bearer and the packet switched radio access bearer is performed by indicating the need for the circuit switched radio access bearer in a first domain indicator information element of the radio resource control connection request message and indicating the need for the packet switched radio access bearer in a second domain indicator information element of a radio resource control connection setup complete message, or by indicating the need for the packet switched radio access bearer in the first domain indicator information element of the radio resource control connection request message and indicating the need for the circuit switched radio access bearer in the second domain indicator information element of the radio resource control connection setup complete message.

5. A wireless device configured for wireless communication in a communication system, the communication system comprising a network node configured to provide radio access bearers to the wireless device, the wireless device comprising:
   a transmitter and receiver respectively configured for transmitting signals to and receiving signals from the communication system; and
   a processing circuit configured to:
   detect a need for both a circuit switched service and a packet switched service during a communication session; and
   send an indication towards the network node, indicating a need for both a circuit switched radio access bearer towards a circuit switched core network providing the circuit switched service and for a packet switched radio access bearer towards a packet switched core network providing the packet switched service, wherein
   the network node is indicated by including a first domain indicator of the circuit switched core network and a second domain indicator of the packet switched core network in a single radio resource control connection request message.

6. A method for radio access bearer establishment, performed in a network node of a communication system, the network node configured to provide radio access bearers to a wireless device, the method comprising:
   receiving, from the wireless device, an indication of a need for both a circuit switched radio access bearer and a packet switched radio access bearer, wherein the received indication includes a first domain indicator of a circuit switched core network and a second domain indicator of a packet switched core network in a single radio resource control connection request message; and
   establishing, for the wireless device, the circuit switched radio access bearer towards the circuit switched core network and the packet switched access bearer towards the packet switched core network.

7. The method of claim 6, wherein the receiving the indication of the need for both the circuit switched radio access bearer and the packet switched radio access bearer comprises receiving in the radio resource control connection request message and a radio resource control connection setup complete message, respectively, the first domain indicator and the second domain indicator.

8. The method of claim 6, wherein establishing the circuit switched radio access bearer and the packet switched radio access bearer for the wireless device comprises prioritizing a setup of the circuit switched radio access bearer over a setup of the packet switched radio access bearer.

9. The method of claim 6, wherein the establishing the circuit switched radio access bearer and the packet switched radio access bearer for the wireless device comprises performing an individual radio access bearer establishment for each radio access bearer type to a respective core network element of the circuit switched core network and packet switched core network, respectively.

10. The method of claim 6, wherein the establishing the circuit switched radio access bearer and the packet switched access bearer for the wireless device comprises performing a combined radio access bearer establishment procedure for the circuit switched radio access bearer and the packet switched radio access bearer.

11. The method of claim 6, wherein establishing the circuit switched radio access bearer is prioritized over establishing the packet switched radio access bearer.

12. A network node for radio access bearer establishment in a communication system, the network node configured to provide radio access bearers to a wireless device, the network node comprising:
   input and output circuitry respectively configured for receiving and sending signaling; and
   a processing circuit operatively associated with the input and output circuitry and configured to:

receive an indication, indicating a need of the wireless device for both a circuit switched radio access bearer and a packet switched radio access bearer, wherein
the received indication includes a first domain indicator of a circuit switched core network and a second domain indicator of a packet switched core network in a single radio resource control connection request message; and
establish, for the wireless device, the circuit switched radio access bearer towards the circuit switched core network and the packet switched radio access bearer towards the packet switched core network.

* * * * *